US008856418B2

(12) United States Patent
Seignol et al.

(10) Patent No.: US 8,856,418 B2
(45) Date of Patent: Oct. 7, 2014

(54) RECEIVING STATION FOR MOBILE HOST EQUIPMENT, AND METHOD OF SHARING RESOURCES USING THE STATION

(75) Inventors: Olivier L. Seignol, Grenoble (FR); Jean-Marie Vau, Paris (FR); Olivier A. Furon, Dinard (FR); Jason R. Oliver, Rush, NY (US)

(73) Assignee: Intellectual Ventures Fund 83 LLC, Las Vegas, NV (US)

(*) Notice: Subject to any disclaimer, the term of this patent is extended or adjusted under 35 U.S.C. 154(b) by 1506 days.

(21) Appl. No.: 12/097,552

(22) PCT Filed: Nov. 27, 2006

(86) PCT No.: PCT/EP2006/011353
§ 371 (c)(1),
(2), (4) Date: Jul. 31, 2009

(87) PCT Pub. No.: WO2007/071306
PCT Pub. Date: Jun. 28, 2007

(65) Prior Publication Data
US 2010/0027049 A1 Feb. 4, 2010

(30) Foreign Application Priority Data
Dec. 21, 2005 (FR) ..................................... 05 12984

(51) Int. Cl.
*G06F 1/16* (2006.01)
*G06F 13/00* (2006.01)
*H04N 1/00* (2006.01)

(52) U.S. Cl.
CPC ........ *G06F 1/1632* (2013.01); *H04N 2201/001* (2013.01); *H04N 2201/0036* (2013.01); *H04N 2201/0044* (2013.01); *H04N 2201/0058* (2013.01); *H04N 1/00127* (2013.01)
USPC ........... 710/303; 710/311; 455/557; 348/375; 348/376

(58) Field of Classification Search
USPC .................................................. 710/300–304
See application file for complete search history.

(56) References Cited

U.S. PATENT DOCUMENTS

| 5,301,346 | A | | 4/1994 | Notarianni et al. |
| 6,098,138 | A | * | 8/2000 | Martinelli et al. ............ 710/315 |
| 6,161,151 | A | * | 12/2000 | Sudhakaran et al. ........... 710/10 |
| 6,170,020 | B1 | * | 1/2001 | Blakeney et al. ................ 710/10 |
| 6,308,234 | B1 | * | 10/2001 | Davies et al. ................. 710/104 |
| 6,309,230 | B2 | | 10/2001 | Helot |

(Continued)

FOREIGN PATENT DOCUMENTS

EP      1 381 213      1/2004

OTHER PUBLICATIONS

Communication on EP Application 06829141.8, dated Feb. 20, 2009.

(Continued)

*Primary Examiner* — Ryan Stiglic (57) ABSTRACT

The invention relates to a receiving station (10) comprising a first physical connection port (20) intended for a first host equipment item and at least one second physical connection port (22) intended for at least one second host equipment item, detection means (24, 34) of host equipment connected to the ports, and the means (30) of automatic selection of combined use modes of the resources of the receiving station and/or connected host equipment, controlled by the detection means (24, 34). Application to handheld portable equipment.

20 Claims, 3 Drawing Sheets

(56) References Cited

U.S. PATENT DOCUMENTS

| | | | |
|---|---|---|---|
| 6,701,394 B2* | 3/2004 | Wang | 710/62 |
| 6,734,915 B2* | 5/2004 | Nagaoka | 348/375 |
| 6,826,632 B1* | 11/2004 | Wugofski | 710/8 |
| 6,934,786 B2* | 8/2005 | Irving et al. | 710/300 |
| 6,934,788 B2* | 8/2005 | Laity et al. | 710/303 |
| 7,014,374 B2* | 3/2006 | Hamaguchi et al. | 400/62 |
| 7,200,685 B2* | 4/2007 | Uemura | 710/2 |
| 7,573,593 B2* | 8/2009 | Hart et al. | 358/1.15 |
| 7,640,385 B2* | 12/2009 | Ng et al. | 710/300 |
| 8,046,517 B2* | 10/2011 | Morozumi | 710/313 |
| 8,274,675 B2* | 9/2012 | Suga et al. | 358/1.15 |
| 2002/0072390 A1 | 6/2002 | Uchiyama | |
| 2003/0061525 A1* | 3/2003 | Lunsford et al. | 713/300 |
| 2003/0063215 A1 | 4/2003 | Tsuji | |
| 2003/0154334 A1* | 8/2003 | Chuang | 710/72 |
| 2003/0222985 A1* | 12/2003 | Goto et al. | 348/207.2 |
| 2004/0021902 A1* | 2/2004 | Ogiwara et al. | 358/1.15 |
| 2004/0088465 A1* | 5/2004 | Bianchi | 710/303 |
| 2004/0185902 A1* | 9/2004 | Yang | 455/557 |
| 2004/0221081 A1* | 11/2004 | Yao et al. | 710/302 |
| 2005/0041953 A1* | 2/2005 | Lo | 386/52 |
| 2005/0043057 A1* | 2/2005 | Lo | 455/556.1 |
| 2005/0088689 A1* | 4/2005 | Suga et al. | 358/1.15 |
| 2005/0185205 A1 | 8/2005 | Eckhaus et al. | |
| 2006/0023069 A1* | 2/2006 | Saito | 348/207.99 |
| 2006/0059529 A1* | 3/2006 | Bernardi et al. | 725/132 |
| 2006/0206631 A1* | 9/2006 | Kuo et al. | 710/20 |

OTHER PUBLICATIONS

International Preliminary Report on Patentability for PCT/EP2006/011353, issued Jun. 24, 2008.

* cited by examiner

RECEIVING STATION FOR MOBILE HOST EQUIPMENT, AND METHOD OF SHARING RESOURCES USING THE STATION

TECHNICAL FIELD

The present invention relates to a receiving station for mobile host equipment such as mobile phones, electronic organizers, or cameras. The receiving station according to the invention can be in particular of the type of printing station that enables the users of digital cameras to produce prints and to recharge the batteries of their devices. It can also act as a commercial interactive terminal made available to the public. The application of the invention relates to all sorts of handheld equipment and aims in particular at the combined use of the resources of this equipment without having to resort to a personal computer.

STATE OF THE PRIOR ART

Handheld electronic equipment is mostly provided with means to generate multimedia data, a memory to store data, means to exchange data, and data reproduction means. The reproduction means can comprise notably a display screen, a loudspeaker and/or a touch-sensitive interface. The means to generate multimedia data can comprise a keyboard, a touch-sensitive screen, an image sensor or again a microphone. They enable the data of text, images, video, sound, or combinations of sound, images and/or text to be generated. These data are commonly called "multimedia data".

The means to exchange data comprise, in their simplest form, a port. In a more sophisticated way, they comprise a communication interface by wireless local area network. This is, for example, a Bluetooth or WiFi type interface. Finally, certain equipment, in particular mobile phones, integrates a communication interface with a distributed communication network. In particular, this is a transmitter/receiver capable of accessing the telephone network or the Internet.

Wireless local area network communication interfaces enable information to be exchanged between equipment. Furthermore, it is possible to link certain equipment items to a personal computer, e.g. through a universal serial port (USB) to exchange data through the computer.

Also well known are receiving stations for data exchanges between handheld portable equipment.

As an illustration, documents (1) and (2) may be referred to whose references are given at the end of the description.

DESCRIPTION OF THE INVENTION

Although data exchanges between portable equipment can be achieved relatively easily, the concurrent and synergetic use of the resources of handheld portable equipment remains a complex operation.

One of the difficulties consists in selecting the data that is to be exchanged and the functions that are to be shared. The control interfaces of handheld equipment are generally relatively small and do not allow the functions of several devices to be made common.

A partial solution consists in making use of a personal computer (PC) that then acts as the control and display unit for using different equipment in a combined way. However, personal computers, even laptops, are expensive and bulky items, compared with handheld portable equipment. Furthermore, the use of a computer to synchronize satellite equipment is perceived as a fussy operation by a number of users.

The object of the invention is to propose a receiving station and in particular a receiving station without personal computer (PC-free), which allows a user to reap the best of their handheld portable equipment, taken individually or in combination.

A number of input or data reproduction components can appear on different types of handheld portable equipment, with various degrees of perfection. For example, a digital camera may also have a small microphone, or a transmitter-receiver. These will certainly be smaller than those of a mobile phone, or an MP3 player. On the other hand, the camera probably has a much better quality image sensor and control screen than those of a "phonecam" (mobile phone with integrated image sensor).

Thus the invention identifies an additional problem which consists in best using functions of the same type available on different equipment, and used concurrently. It is also an object to resolve this problem.

Yet another object is to simplify to the maximum the making common of equipment functions, resources and data.

To achieve these objects, it is the more precise object of the invention to propose a receiving station comprising interface means intended for host equipment, detection means of host equipment connected to the ports, and means of automatically selecting the combined use modes of the resources of the receiving station and/or connected host equipment, controlled by the detection means.

In particular, the interface means can include a first port intended for a first host portable equipment item and at least a second port intended for at least a second host portable equipment item.

The invention also relates to a method for managing multimedia equipment, using a station as mentioned above. The method comprises an inventory step of the resources of the host equipment connected to the ports and a step of automatically selecting the combined use modes of the resources.

"Resources" means the components and functions of acquisition, saving, sharing and reproducing data or multimedia objects.

The combined use mode of the resources can only take into account the resources of connected host equipment. It can also take into account the resources or functions specific to the receiving station. In particular, the receiving station may have a larger control interface than that of the host equipment. It is thus possible to use this interface both for controlling functions specific to the receiving station and also those of the host equipment.

Different types of host equipment combinations can be planned and used to start various types of combined uses of the resources.

Table I below gives the different functions liable to be available on the usual mobile portable equipment. It shows the high or low probability of the presence of a given multimedia function with a first +/− sign, and the more or less developed nature of this function with a second +/− sign. As an illustration, the shooting function on a camera is certain and is strongly developed. It is shown by the symbol ++. The table refers to a mobile phone equipped with an image sensor (phonecam), to a folding mobile phone (clam-shell), to a digital camera and to a digital album.

TABLE I

| Equipment/function | Image shooting | Sound recording | Photo display | Audio playback | LAN access | WAN access | Software downloading | Memory |
|---|---|---|---|---|---|---|---|---|
| Phonecam | +/− | +/+ | +/− | +/+ | +/+ | +/+ | +/+ | +/− |
| Folding phone | +/− | +/+ | +/− unfolded −/− folded | +/− | +/+ | +/+ | +/+ | −/− |
| Camera | +/+ | +/− | +/+ | −/− | +/− | −/− | −/− | +/+ |
| Digital album | −/− | −/− | +/+ | +/− | +/− | −/− | −/− | +/+ |

The usual functions of the receiving station are added to the functions appearing in Table I. Conventionally, these are the functions of memory, data exchange, user interface and battery charging of the connected equipment. A printer function can be added to these.

Table II gives some examples of possible combined use of the various pairs of host equipment.

TABLE II

| Equipment 1-Equipment 2 | Phonecam | Camera | Electronic album |
|---|---|---|---|
| Phonecam | Sharing multimedia data Image file organization | Sharing multimedia data Image downloading Videoconference | Sharing multimedia data Videoconference |
| Camera | | Sharing multimedia data Viewing photos/video clips | Image archiving Sharing multimedia data |
| Electronic album | | | Sharing multimedia data Image archiving |

Given the large number of possible combined uses and lacking the device of the invention, it would be extremely fussy for the user to mutually connect up the devices and control them so that they interact in the desired manner.

This problem is resolved by the invention in the sense that selection of the use modes is automatic. As will appear in the following text, the automatic nature of selecting the use modes does not completely exclude the possibility for the user of making a selection of the resources to be combined.

In one particular and simplified embodiment of the station, the ports are dedicated to preset functions. Thus the selection means are controlled by the detection means to automatically select a combined use mode according to an occupation status of the ports. In this case, host equipment detection can amount to the simple detection of the presence or absence of host equipment connected to a given port.

The connection of host equipment to a specific port and further the connection of two host equipment items to two ports are interpreted so as to make an inventory of the available resources and then a selection of the combined use of the resources.

Here an inventory of the available resources is simply established by detecting the occupation status of the ports. Indeed, it is considered that host equipment connected to a given port inevitably has certain set resources that enable it to perform certain corresponding functions.

For illustration, a first port (port 1), located on the front of the station, can be linked to a printing function and to a display function. A second port (port 2), located on the rear of the station, can be linked to a function of supplying data and to a recording function. Table III shows a possibility of automatic selection of use modes when a digital camera and/or a phonecam are connected respectively to the first and/or second port of the receiving station, the receiving station also being capable of memorizing image data and printing photos. The first row and first column show host equipment connected to the first and second port respectively. They also show the corresponding occupation status by stating "yes" or "no" for the detection of host equipment.

TABLE III

| Port 1/Port 2 | Camera 1 Detection = yes | Phonecam 1 Detection = yes | Nothing Detection = no |
|---|---|---|---|
| Camera 2 Detection = yes | Display on the control screen of camera 1 of image data from camera 2 | Display on the control screen of phonecam 1 of image data from camera 2 | Recording of the data of camera 2 in a memory of the receiving station |
| Phonecam 2 Detection = yes | Display on the control screen of camera 1 of image data from the phonecam | Display on the control screen of phonecam 1 of image data from phonecam 2 | Recording of the data of phonecam 2 in a memory of the receiving station |
| Nothing Detection = no | Printing by the station of photo prints of image data from camera 1 | Printing by the station of photo prints of image data from phonecam 1 | Receiving station on standby |

In the implementation described, the user implicitly dictates the use mode by choosing to connect host equipment to one port rather than to the other. When several host equipment items each provided with a control screen are connected to the station, it would then be sensible to connect, where appropriate, the equipment whose screen has the best display capacities to the first port of the station. However, it is possible, for reasons of user choice, to connect equipment with a lower display capacity such as the phonecam. This can be useful when two functions are started concurrently. Indeed it can be imagined that the function of displaying images on the control screen of equipment linked to the first port is accompanied by a function of image data or image file transfer. The transfer takes place, for example, from the equipment connected to the second port towards the equipment connected to the first port. The combined use of the resources can include that of a control interface of the receiving station. In particular, it can be a single multipurpose button of the station. In this example, a particular function is assigned to the multipurpose button automatically by taking into account the occupation status of the ports. This is a special case of the automatic selection of use modes. Table IV, comparable to Table III shows, still for illustration, an implementation option including a multipurpose button of the receiving station as resource. It shows, where appropriate, the function obtained by actuating the button or not. This function is displayed bold or light to distinguish the two alternatives.

The means to identify host equipment resources can be simple mechanical or electrical means of recognition of the type of host equipment connected. In this case, it is assumed that a given type of host equipment inevitably has set resources. For example, the detection of a digital camera is interpreted as the inevitable presence of an image sensor and a control screen. The identification or inventory of resources can also take place by interchange with the host equipment according to a protocol enabling identification of the available functions. The interchange can take place through the physical connection port of the receiving station, or by communication via wireless local area network.

The means for identifying resources interrogate each connected host equipment and draw up for this host equipment an inventory of the available resources in terms of functions and

TABLE IV

| Port 1/<br>Port 2/ | Camera 1<br>Detection = yes | Phonecam 1<br>Detection = yes | Nothing<br>Detection = no |
|---|---|---|---|
| Camera 2<br>Detection = yes | Display on the control screen of camera 1 of image data from camera 2. Recording of the image data of camera 1 in a memory of camera 2 | Display on the control screen of phonecam 1 of image data from camera 2 Recording of the image data of phonecam 1 in a memory of camera 2 | Recharging of the batteries of camera 2 Recording of the data of camera 2 in a memory of the receiving station |
| Phonecam 2<br>Detection = yes | Display on the control screen of camera 1 of image data from the phonecam Recording of the image data of camera 1 in a memory of camera 2 | Display on the control screen of phonecam 1 of image data from phonecam 2 Recording of the image data of phonecam 1 in a memory of phonecam 2 | Recharging of the batteries of phonecam 2 Recording of the data of phonecam 2 in a memory of the receiving station |
| Nothing<br>Detection = no | Printing by the station of photo prints of image data from camera 1 Recharging of the batteries of camera 1 | Printing by the station of photo prints of image data from phonecam 1 Recharging of the batteries of phonecam 1 | Receiving station on standby |

It is worth stressing that the tables only give examples of implementation. They do not exclude the use of other host equipment, such as organizers, electronic albums or digital pens and do not exclude other functions such as enhancing image data with contextual imaging data or taking notes. In particular, by knowing the shooting date of an image by a first host equipment item, the image data can be matched with contextual data, such as data relating to the contents of an organizer, to a universal resource locator (URL) or even to the references of a piece of music distributed by another host equipment item, at the same time. The enhancing of images is a known art. However, it can be greatly facilitated by being controlled by the receiving station in the same way as other combined use modes of the resources.

According to a perfection of the invention, the detection means of host equipment also comprise the means to identify the resources of the connected host equipment. In this case, the selection means are controlled by the detection means to automatically select a combined use mode according to the resources identified. The choice of use mode can also additionally take account of the occupation status.

possibly capacities. For illustration, a phonecam can thus communicate to the receiving station its function of making a radio connection to a WAN, its recording function and its display function. It can also indicate its total or free memory capacity, its display capacity in terms of screen dimensions and resolution, and its recording capacity in terms of image sensor resolution.

In this case, if two connected host equipment items have the same function with different capacities, it is possible to select the equipment which has the better capacity. For illustration, if an electronic album provided with a large-size display screen is connected to the station at the same time as a phonecam, a combined use mode is offered to the user wherein the images captured by the phonecam are displayed on the electronic album screen. Actually, it is more advantageous to view the phonecam photos on the large screen.

Table V gives examples of identified resources and combined use modes of the host equipment, proposed according to the resources.

TABLE V

| Port 1/<br>Port 2/ | Resource | Phonecam | Electronic album | Nothing |
|---|---|---|---|---|
| Resource | | Image shooting<br>Display<br>Remote communication | Display<br>Memory | |
| Digital camera | Image shooting<br>Display | Videoconference<br>Image enhancing | Viewing images from the camera on the album<br>Memorizing images in the album | Battery charging<br>Printing of images captured by the camera |
| Mobile phone | Remote communication | Image data exchange, | Downloading of image data to the album<br>Enhancing album images | Battery charging<br>Updating the receiving station's operating system |
| Nothing | | Battery charging<br>Updating the receiving station's operating system | Battery charging<br>Printing the viewed images | |

In certain boxes of the table, an alternative between two options of combined use of the resources is suggested, one option being indicated in bold. In this case, it is possible additionally to use a multipurpose selection button of the receiving station, as described previously, or to make use of the fact that the devices are connected to one of the ports rather than to the other to refine the selection. One combined use mode of host equipment can, for example, be dictated by the capacities or functions of the equipment installed on one of the ports considered as the "master" port. For example, this is the port located on the front of the station. For illustration, the use of the digital album in combination with the digital camera can start a display mode of the images when the album is linked to the "master" port, and start the saving of image data from the camera in the memory of the digital album when the digital camera is connected to the "master" port.

The described method of managing resources can also comprise a detection step of any host equipment that is not compatible or not fully compatible with an operating software framework of the receiving station. In this case, the downloading to the receiving station of software data for receiving the non-compatible host equipment can be started automatically. The downloading can be done, either by the station, if it has suitable communication means, or using host equipment that has communication means with a WAN, such as the Internet. This is for example a mobile phone. The downloading can depend on the connection to the station of such equipment.

Other characteristics and advantages of the invention will appear in the following description, with reference to the figures in the appended drawings. This description is given purely as an illustration and is not limiting.

DETAILED DESCRIPTION OF THE MODES OF IMPLEMENTING THE INVENTION

Figure 1:
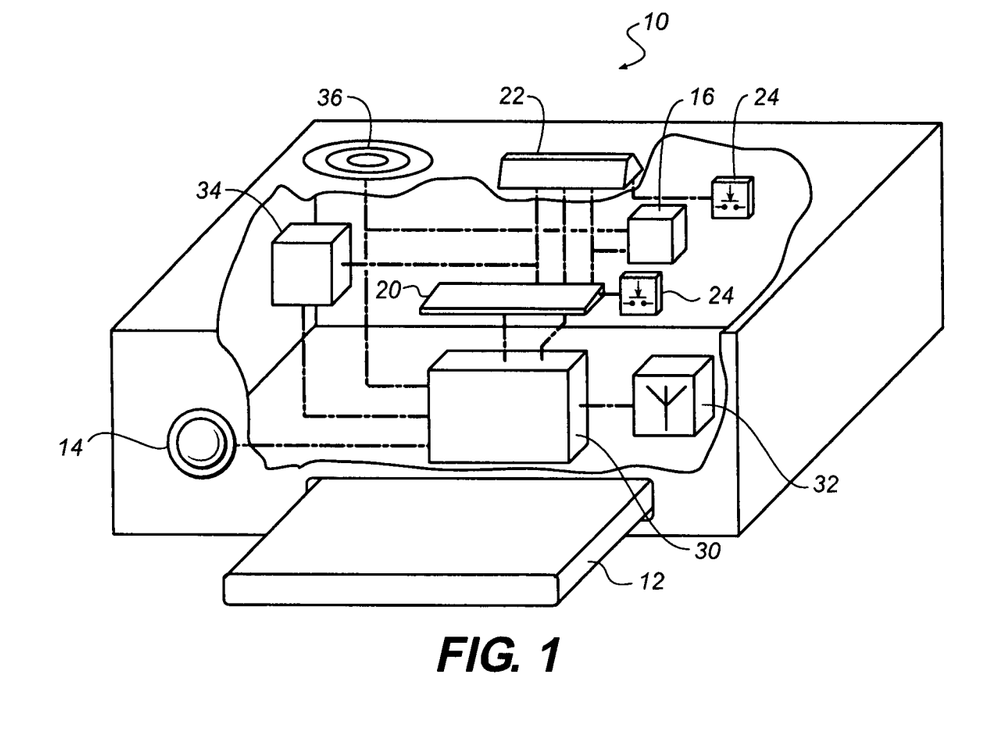
FIG. 1 is a simplified schematic representation of a receiving station illustrating one particular implementation of the invention.

The receiving station 10 of FIG. 1 is intended to receive one or several host equipment items and facilitate the combined use of the resources of the equipment connected in it. The receiving station itself has a number of resources capable of being implemented in a combined use with one or several host equipment items. In this case, this is a thermal printer 12, a control interface 14 and a electrical power supply 16.

The printer in particular enables photographic prints to be produced from image files contained in the host equipment and sent to the receiving station. The control interface 14 enables the user to select functions specific to the receiving station, and in particular to select the printing qualities or quantities. In particular, it comprises a multipurpose button intended for combined use with the connected host equipment. The function of the button is automatically determined according to the resources of the connected host equipment and/or the location of its connection on the station.

The receiving station of FIG. 1 indeed comprises two physical connection ports. A first port 20 is located on the front of the station, and a second port 22 is located on the rear of the station. Here the terms front and rear mean in relation to the station oriented so that the control interface 14 is facing the user. The first port and the second port can be identical or different. In particular, the rear port can be a port compatible with mobile phones and the front port compatible with cameras or viewers whose connectors are generally different than those of telephones. A greater number of connection ports can also be planned.

The ports 20, 22 are linked to the current source 16 so as to be able to supply a charge current for the batteries of the connected host equipment.

They comprise a number of conductive pins, not shown in detail. The pins are essentially intended to exchange signals or data with the connected host equipment. Pins are also planned to supply a charge current for the host equipment. The ports are linked to a control unit 30, for example a processor, whose function is to establish the combined use modes of the host equipment, and, according to the selected use mode, to automatically cause a data or data file transfer between the equipment to enable the shared use of these data.

The exchanged data, in particular, can be image data, contextual data of time, date and location, software data or even, more generally, multimedia data.

The exchanged data can also be data informing the receiving station about the capacities and functions of the connected host equipment. These data are exchanged according to an identification protocol such as, for example, PTP (Picture Transfer Protocol).

It is worth stressing that if the data are exchanged in response to the connection of one or several host equipment items on the ports, the exchanged data do not inevitably go through the physical connection ports. Exchange of the data through the physical ports is only one exchange option. It can take place particularly when there is full compatibility of the port with a connector of the host equipment. A second data exchange option consists in using a wireless LAN, for example, according to the Bluetooth protocol. For this purpose, the station comprises a radio transmitter-receiver 32 linked to the control unit 30. In this case, the transmitter-receiver also constitutes an interface means. It enables radio connection not only with the host equipment present on the station, but also any equipment present in the neighborhood of the station. The transmitter 32 enables for example the functions of equipment that the user has arranged on the station and those of a mobile phone kept in a pocket to be combined.

The ports can be combined with sensors intended to detect the presence or absence of host equipment. This is for example a switch linked to two electric pins contacted by the host equipment. It can also act as a detector of voltages on the terminals of a connector of host equipment connected to the port. Again it can involve a simple switch 24 whose pushbutton is activated by the mechanical connection of the equipment onto the port of a capacitive or inductive detector; inductive or capacitive detectors detecting the modification of impedance caused by the equipment. In a more sophisticated way, the presence can be detected by a port controller 34 which manages data exchanges with the equipment connected to the port. The port controller also enables the collection of information relating to the functions and capacities of the host equipment. Information can be collected by known discovery processes such as "UPnP" (Universal Plug and play). The port controller can be merged with the control unit 30.

Having collected the occupation status of the ports, and, possibly the resources and capacities of the connected host equipment, the control unit selects, according to this information, the combined use modes of the equipment resources. The control unit can also assign, where appropriate, a set selection function to the multipurpose button of the interface 14.

According to the selected combined use mode, the control unit can also automatically cause exchanges of multimedia data that suit the use, and control the operation of the host equipment.

In particular, the control unit 30 can contain a cross-reference table that plans for a large number of possible combinations of host equipment, according to its presence on one port or the other, and/or according to the resources or capacities of the equipment. The cross-reference table associates a set use mode with each combination. The table also plans for the data exchanges, the selection functions of the interface 14 and the commands intended for the host equipment to enable its combined operation. The contents of the table may be renewed by the downloading of an updated table. This can take place with the connection onto the station of a mobile phone or host equipment having a communication capacity with a WAN such as the Internet.

Finally it is possible to update the cross-reference table according to a learning mode of the user's habits.

Besides the connection ports 20 and 22 intended for connectors, and the radio port 32, the station can also comprise an inductive port 36. The inductive port 36 is connected to the control unit 30 and to the electrical power supply. It enables, like the ports 20 and 22, power to be supplied to the host equipment by high frequency radiation. It is intended in particular for host equipment provided with an antenna or a conductive loop acting as energy receiver. The connection of host equipment to the inductive port 36 is made very simply by putting the equipment on an area of the station where the port's transmission loop is located. The port can in addition act to detect the presence of equipment, by measuring the impedance variations.

Figure 2:
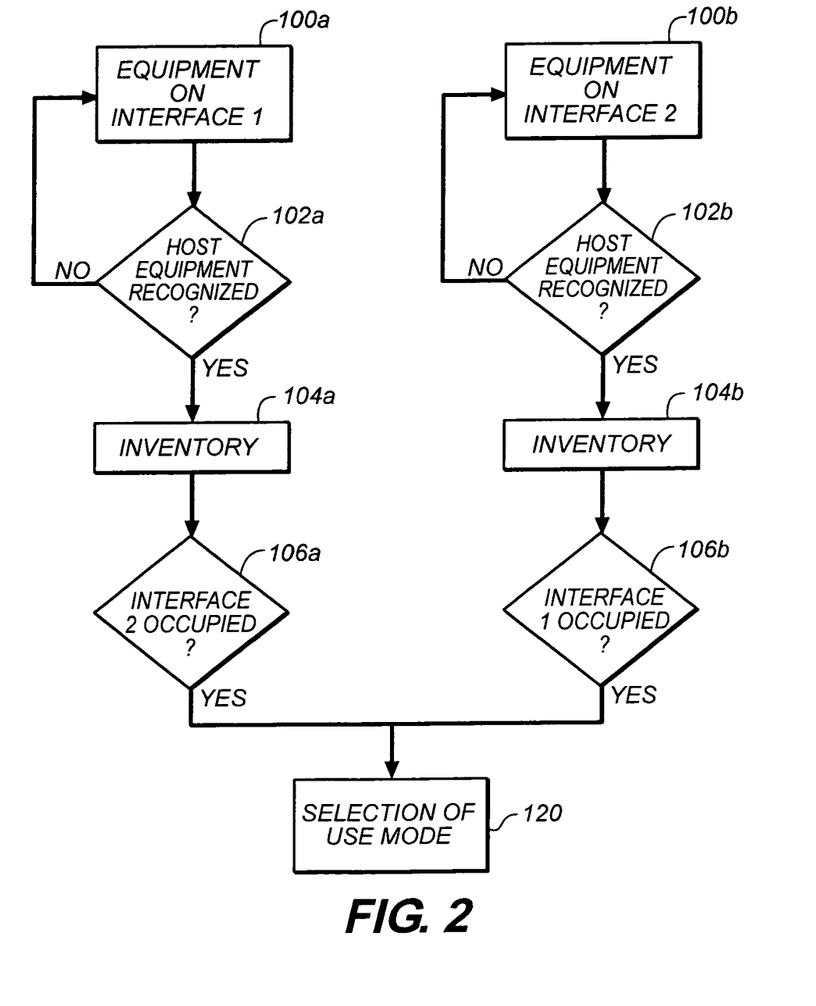
FIG. 2 is an organization chart showing one operating possibility of a receiving station according to the invention.

The organization chart of FIG. 2 shows one possibility of operation of a receiving station according to the invention having at least two ports that can be identified as "port 1 and "port 2". These are, for example, connection ports, radio ports or inductive ports, such as ports 20 and 22, 32 and 36 of FIG. 1, or even a combination of such ports.

References 100a and 100b show an action of the user that consists in presenting one or several host equipment items to the station. This is the case when the user connects host equipment to a connection port, or when they approach host equipment close enough to the receiving station to enter it into the station's radio or inductive field of coverage.

Here the left hand branch of the diagram is described, while nevertheless stating that the comments also apply to the right hand branch which is symmetrical with it. Identical references followed by the letters a or b respectively correspond to the same steps in both branches. It is worth noting simply that, although identical, the steps of both branches are not inevitably concurrent.

Following the presentation 100a of host equipment, for example its connection to a connection port, there is a step 102a of recognition of the host equipment. The host equipment is recognized, if it changes the status of the port, and in particular if the sensors planned for this purpose recognize the presence of host equipment. It is also recognized if a radio or inductive communication is established and if this identifies compatible host equipment.

When the equipment is recognized, there is an inventory step 104a in which the resources of the host equipment are listed. As previously described, the resources can be simply assumed and deduced from the fact that the equipment is presented to one connection port rather than to the other. The inventory can also operate a data exchange during which the host equipment communicates to the receiving station its functions and capacities.

Before selecting a use mode 120, a step 106a consists in checking if other host equipment items are connected or presented to the other ports of the station. This step can take place before or after the inventory.

For illustration, when equipment is connected on one of the connection ports 20 or 22 visible in FIG. 1, it is possible to automatically start a search protocol consisting in identifying and interrogating any host equipment, present in the neighborhood of the station, and provided with wireless LAN communication means. This then starts operations 100b, 102b, 104b and possibly 106b.

The last step, shown by reference 108, consists in selecting a use mode that takes into account the resources of the functions of one or more host equipment items present, and possibly functions specific to the station.

Figure 3:
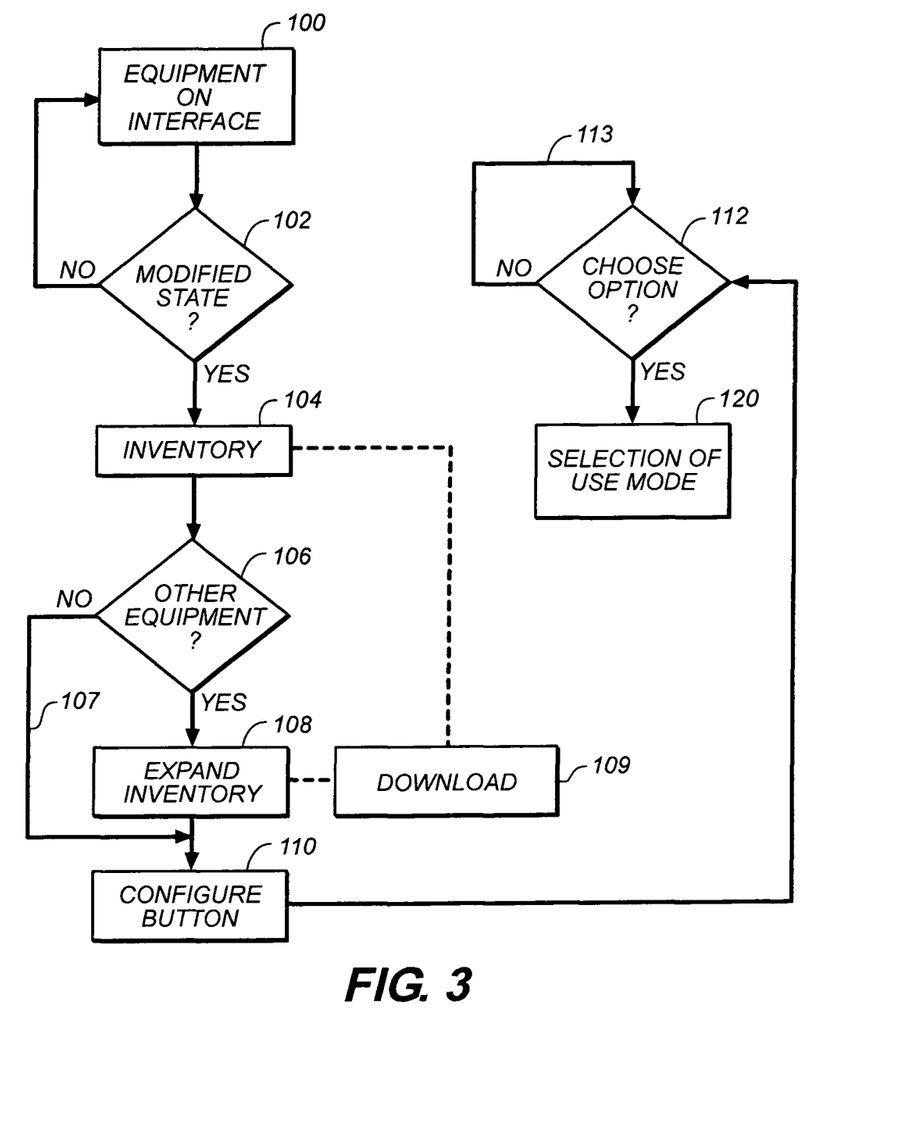
FIG. 3 is an organization chart showing another operating possibility of a receiving station according to the invention.

Another possibility of operation is illustrated by FIG. 3.

The first steps of presenting 100 the first host equipment, of detecting 102 the equipment, of inventorying 104 its functions, and of searching 106 for other host equipment in the station environment are equivalent to the steps 100a, 102a, 104a and 106a described above.

When one or several host equipment items are present, an expanded inventory 108 can take place. An expanded inventory means the search for the functions of host equipment present, together where appropriate with downloading to the receiving station of software data. This is software data enabling or facilitating the implementation of the available functions, the interactions between host equipment or the interactions between host equipment and the station. The downloading is shown with the reference 109. The downloading can also take place as from the inventory 104 made for the first host equipment.

If there is no additional host equipment, the expanded inventory step 108 can be omitted as shown by the arrow 107.

A following optional step 110 consists in configuring the multipurpose selection button of the receiving station to offer the user the option of choosing between two or several possible use modes. These various modes are however generated automatically by the receiving station according to the functions of the available host equipment. The selection button can therefore be considered as a function or resource specific to the receiving station, combined with that of the host equipment.

In response to the entry 112 by the user of a choice between the options that are proposed to them, the selection 120 of a use mode finally takes place. This then integrates not only the functions of the host equipment and those of the receiving station, but also the user's wish.

An arrow 113 shows the wait for the entry by the user of their choice. It is possible, as an alternative, to retain a choice by default, among the proposed options, when the user does not activate the button within a set time.

CITED DOCUMENTS

1) U.S. Pat. No. 6,309,230
2) U.S. Pat. No. 6,701,394

The invention claimed is:

1. A method comprising:
   detecting, by a processor, at least two handheld devices, wherein each of the at least two handheld devices is connected to an interface;
   determining, by the processor, an inventory of available resources for each of the at least two handheld devices, wherein the available resources are each a functionality of a handheld device;
   determining, by the processor, a plurality of possible combined use modes based on the inventory of available resources; and
   selecting, by the processor, a combined use mode from the plurality of possible combined use modes, wherein the combined use mode accesses the respective available resources of the at least two handheld devices, and wherein the combined use mode provides control of the available resources of each of the at least two handheld devices at the same time.

2. The method of claim 1, wherein the interface comprises one of a wired port, a wired network connection, or a wireless network connection.

3. The method of claim 1, wherein the available resources for the at least two handheld devices are determined based on the interface to which each of the at least two handheld devices are connected.

4. The method of claim 1, wherein the available resources for each of the at least two handheld devices are received from each of the at least two handheld devices.

5. The method of claim 1, wherein at least two of the at least two handheld devices are determined to have a similar resource.

6. The method of claim 5, wherein the similar resource of only one of the at least two of the at least two handheld devices is available in the combined use mode.

7. The method of claim 1, wherein the inventory of available resources comprises at least two of the available resources for each of the at least two handheld devices.

8. The method of claim 1, further comprising receiving, by the processor, a user-selected combined use mode, wherein the user-selected combined use mode is selected from the plurality of possible combined use modes, and wherein the user-selected combined use mode is the combined use mode selected by the processor.

9. The method of claim 1, further comprising:
   determining, by the processor, a function associated with the combined use mode; and
   executing, by the processor, the function on the interface.

10. The method of claim 9, wherein the function is printing a digital media file from one of the at least two handheld devices.

11. The method of claim 9, wherein the function is charging a battery of one of the at least two handheld devices.

12. The method of claim 1, wherein the selection of the combined use mode is automatically performed by the processor based on the presence of a more developed available resource in one of the at least two handheld devices as compared to a different one of the at least two handheld devices.

13. A system comprising:
   one or more processors configured to:
      detect at least two handheld devices, wherein each of the at least two handheld devices is connected to an interface;
      determine an inventory of available resources for each of the at least two handheld devices, wherein the available resources are each a functionality of a handheld device;
      determine a plurality of possible combined use modes based on the inventory of available resources; and
      select a combined use mode from the plurality of possible combined use modes, wherein the combined use mode accesses the respective available resources of the at least two handheld devices, and wherein the combined use mode provides control of the available resources of each of the at least two handheld devices during a same time period.

14. The system of claim 13, wherein the available resources for the at least two handheld devices are determined based on the interface to which each of the at least two handheld devices are connected.

15. The system of claim 13, wherein the available resources are received from each of the at least two handheld devices.

16. The system of claim 13, wherein at least two of the at least two handheld devices are determined to have a similar resource.

17. A non-transitory computer-readable medium having instructions stored thereon, the instructions comprising:
   instructions to detect at least two handheld devices, wherein each of the at least two handheld devices is connected to an interface;
   instructions to determine an inventory of available resources for each of the at least two handheld devices, wherein the available resources are each a functionality of a handheld device;
   instructions to determine a plurality of possible combined use modes based on the inventory of available resources; and
   instructions to select a combined use mode from the plurality of possible combined use modes, wherein the combined use mode accesses the available resource of each of the at least two handheld devices, and wherein the combined use mode provides control of the available resources of each of the at least two handheld devices at the same time.

18. The non-transitory computer-readable medium of claim 17, wherein the available resources of the at least two handheld devices are determined based on the interface to which each of the at least two handheld devices are connected.

19. The non-transitory computer-readable medium of claim 17, wherein the available resources of the at least two handheld devices are received from each of the at least two handheld devices.

20. The non-transitory computer-readable medium of claim 17, wherein a resource comprises one of a camera, a microphone, or a display.

* * * * *